Figure 1A:
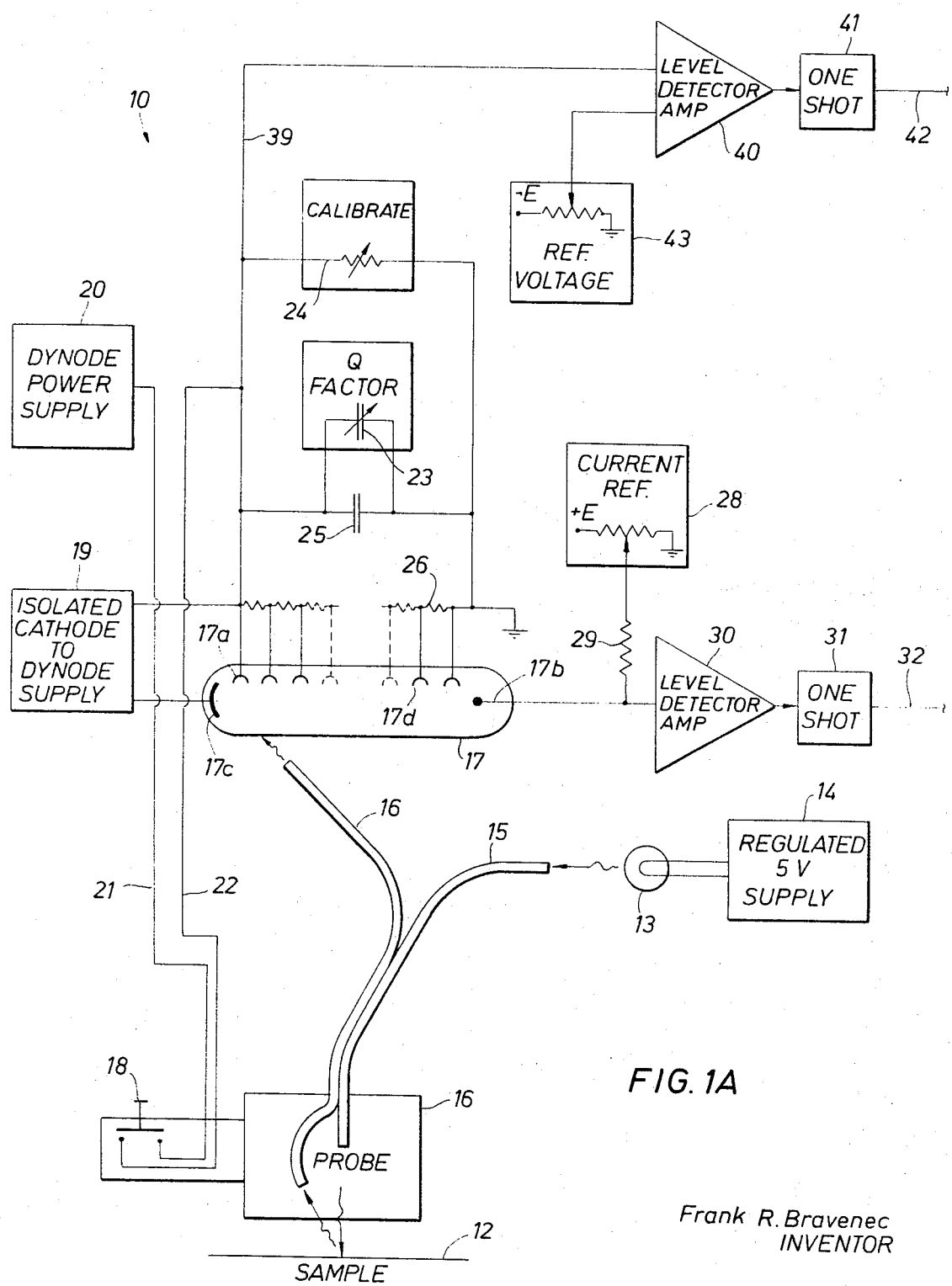

United States Patent [19]
Bravenec

[11] 3,765,776
[45] Oct. 16, 1973

[54] CALIBRATED DENSITOMETER ACCOMMODATING VARIOUS COLOR TONES

[76] Inventor: Frank R. Bravenec, 2518 S. Blvd., Houston, Tex. 77006

[22] Filed: Feb. 22, 1971

[21] Appl. No.: 117,354

Related U.S. Application Data

[63] Continuation-in-part of Ser. No. 826,788, May 22, 1969, abandoned.

[52] U.S. Cl.................. 356/189, 250/207, 250/227, 356/202, 345/209
[51] Int. Cl.......................... G01j 3/48, G01n 21/48
[58] Field of Search.................... 356/239, 237, 201, 356/202, 209, 189; 250/207, 227

[56] References Cited
UNITED STATES PATENTS
3,435,239  3/1969  Stalberg ............................ 250/218

*Primary Examiner*—David Schonberg
*Assistant Examiner*—V. P. McGraw
*Attorney*—Donald Gunn

[57] ABSTRACT

A densitometer circuit uses a photo-multiplier tube to measure light levels. The tube is provided with an independent and preferably non-variant power supply connected between the cathode and first dynode. All other dynodes and anodes are powered by an RC decay circuit. Closure of a switch charges the RC circuit which consequently powers the photomultiplier tube. The tube compresses the signal in a manner yielding a logarithmic output signal.

As an alternative embodiment, the densitometer circuit is adapted for use with several color tones wherein the various color tones are passed through selective filters with light passing therethrough falling on the light sensitive device, preferably the photo multiplier tube. The maximum amount of light will vary dependent on the color of the filter. The apparatus provides adjustments whereby the sensitivity of the apparatus is defined at two points and measurements at all other points therebetween are therefore accurate.

24 Claims, 5 Drawing Figures

Frank R. Bravenec
INVENTOR

BY Donald Gunn

ATTORNEY

PATENTED OCT 16 1973 3,765,776
SHEET 2 OF 4
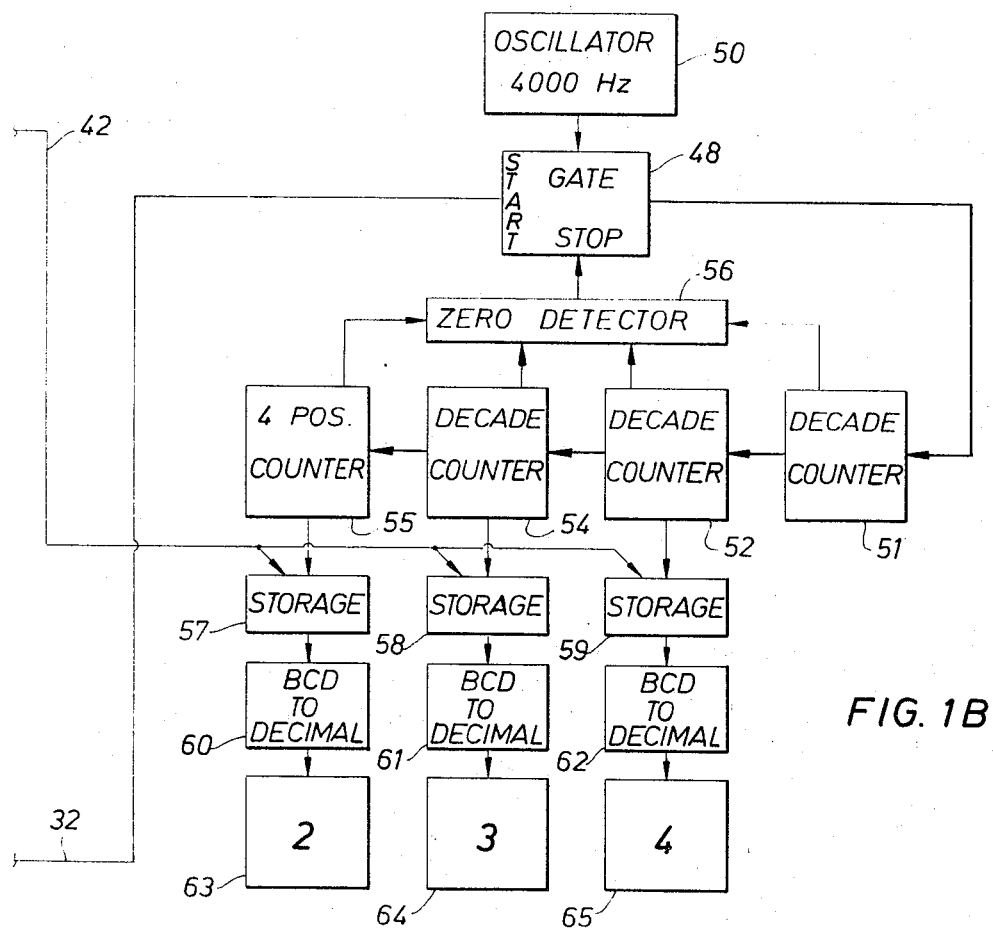
FIG. 1B
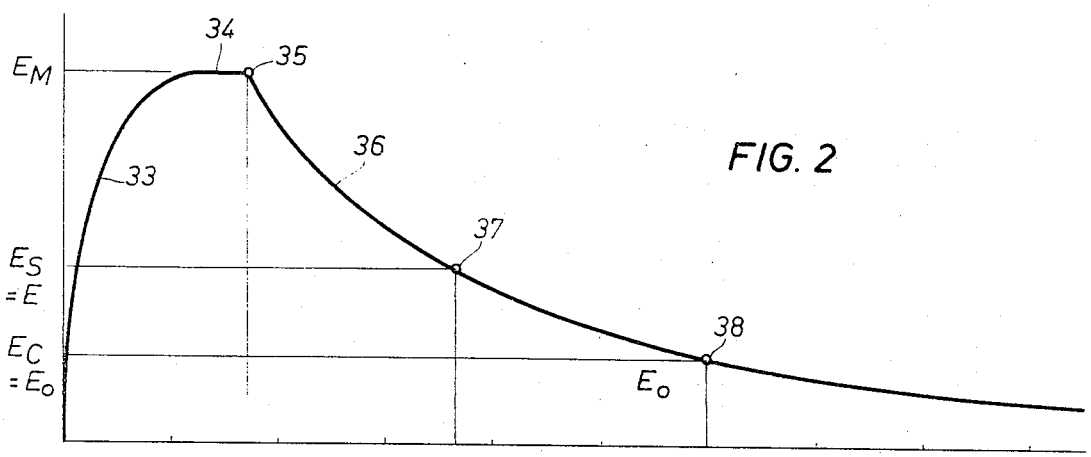
FIG. 2
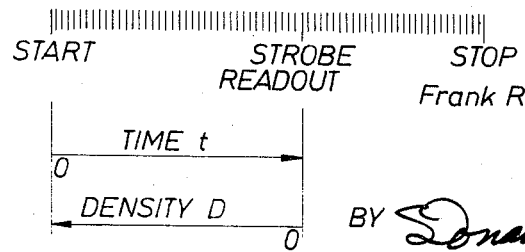
Frank R. Bravenec
INVENTOR
BY Donald Gunn
ATTORNEY Frank R. Bravenec
INVENTOR

CALIBRATED DENSITOMETER ACCOMMODATING VARIOUS COLOR TONES

RELATED APPLICATIONS

Applicant is the inventor of the densitometer disclosed in application Ser. No. 826,788, filed May 22, 1969 now abandoned, of which this application is a continuation-in-part.

SUMMARY OF PROBLEM AND SOLUTION

The graphic arts industry often requires measurements of the optical density of a photograph, negative, or other image source. Devices of this general sort have been provided in the past. However, the following summerization of the present device will set forth certain features in wide ranging apparatus and ease of calibration which have not been found in commercially available equipment. Moreover, the invention herein disclosed forms an easily readable digital output signal.

In the utilization of a densitometer such as that disclosed in the parent application, the optical density of a particular item is measured and indicated typically on a scale ranging from 0.00 to 4.00. The scale is logrithmic. One end point of the scale is determined by a maximum quantity of light. The other end point is determined by a 10,000 : 1 reduction of the maximum light. When a black and white reading is made, the optical system lets through a substantial quantity of light. When a color reading is made, as might occur through the use of a red filter, substantially less light passes through the optical system. A colored filter is selective and tends to reject various colors whereas an unfiltered optical system admits a wider spectrum and passes a greater quantum of light. Consequently, the light falling on the light sensitive device varies dependent on which filter is inserted.

The graphic arts industry normally uses three primary colors with black defining a fourth color. The black or white reading is obtained through the use of a non-selective visual filter and lens system whereas the three primary colors are tested by using selective colored filters. Not only do the three primary colors differ from the broad spectrum optical system, but the three primary colors sometimes differ from each other dependent upon the particular filter used and its color definition. For instance, red may be defined by one standard in photographic work and by another standard in ink control in a press room.

The present invention is summarized as including an apparatus which responds to reflected light from an unknown sample to measure optical density through the use of an RC circuit discharge curve. The RC circuit is charged when a reading is desired and charges to a level higher than that required to operate the various dynodes and anode of the photo multiplier tube. As the RC circuit is discharged, the value of plate voltage of the photo multiplier reaches a predetermined level which triggers a counter having a clock input to accumulate a numerical total providing a digital output of the optical density. The counter is stopped when the RC decay curve reaches a desired level. The desired voltage is that necessary to obtain the desired plate current for zero optical density. A particularly important feature of the present invention is the use of a floating isolated voltage supply connected between the cathode and the first dynode to assure or ascertain sufficient voltage to capture all electrons emitted from the cathode to provide a particularly linear device which is well regulated and controlled at all operative ranges.

This invention is further summarized as providing a means whereby the response of the densitometer which converts the light logrithmically to a straight line function is defined by two points in the straight line which therefore determines the calibration of the system. Such changes are accommodated for each of four curves, preferably the three primary colors and unfiltered light. This is achieved by defining the minimum of current which will flow for a given color input, and determining the maximum current which will flow corresponding to the maximum quantity of light falling on the light sensitive device. Circuitry for accomplishing these two functions is shown in the context of an optical densitometer using a photo multiplier tube.

Figure 3:
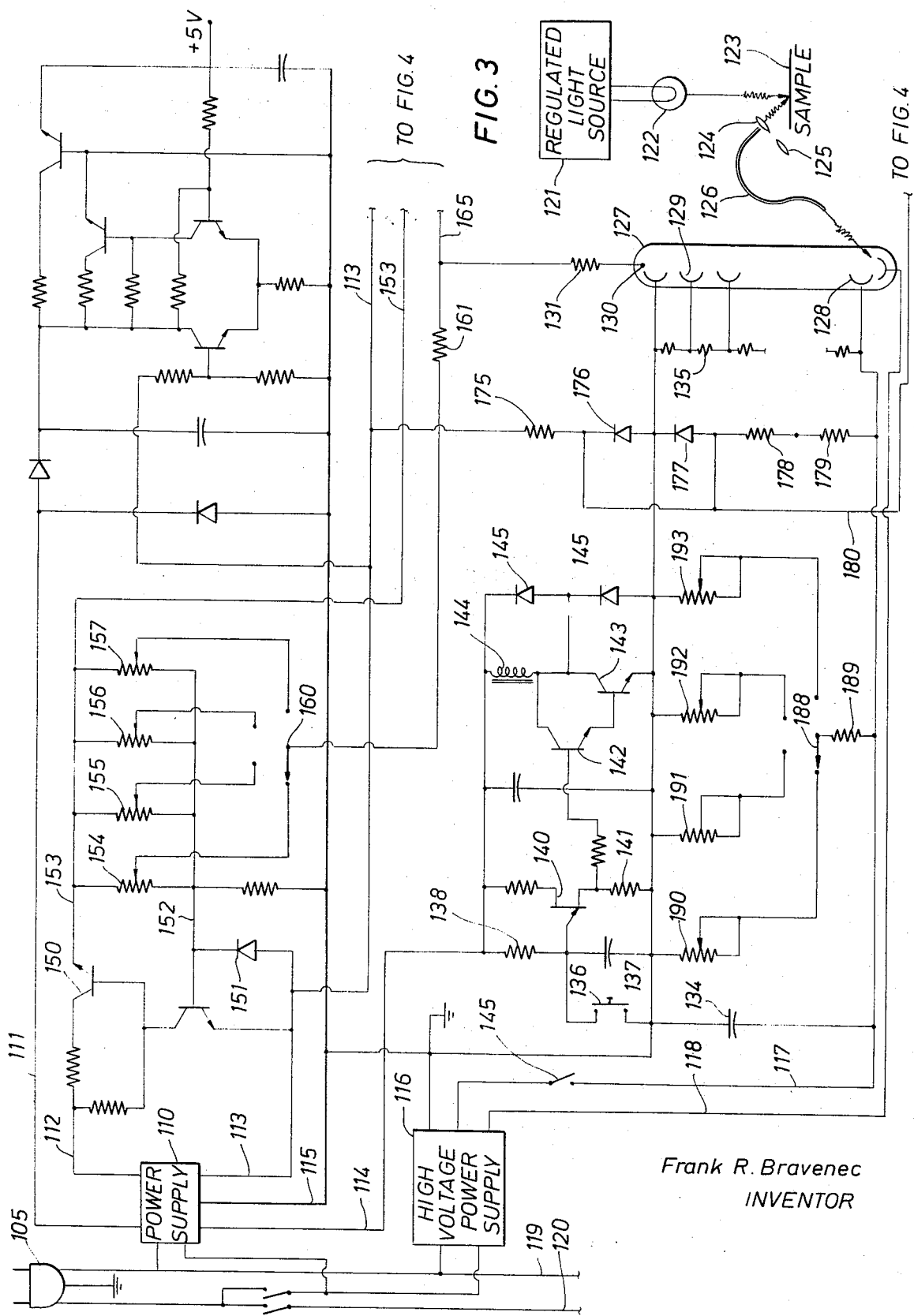
Figure 4:
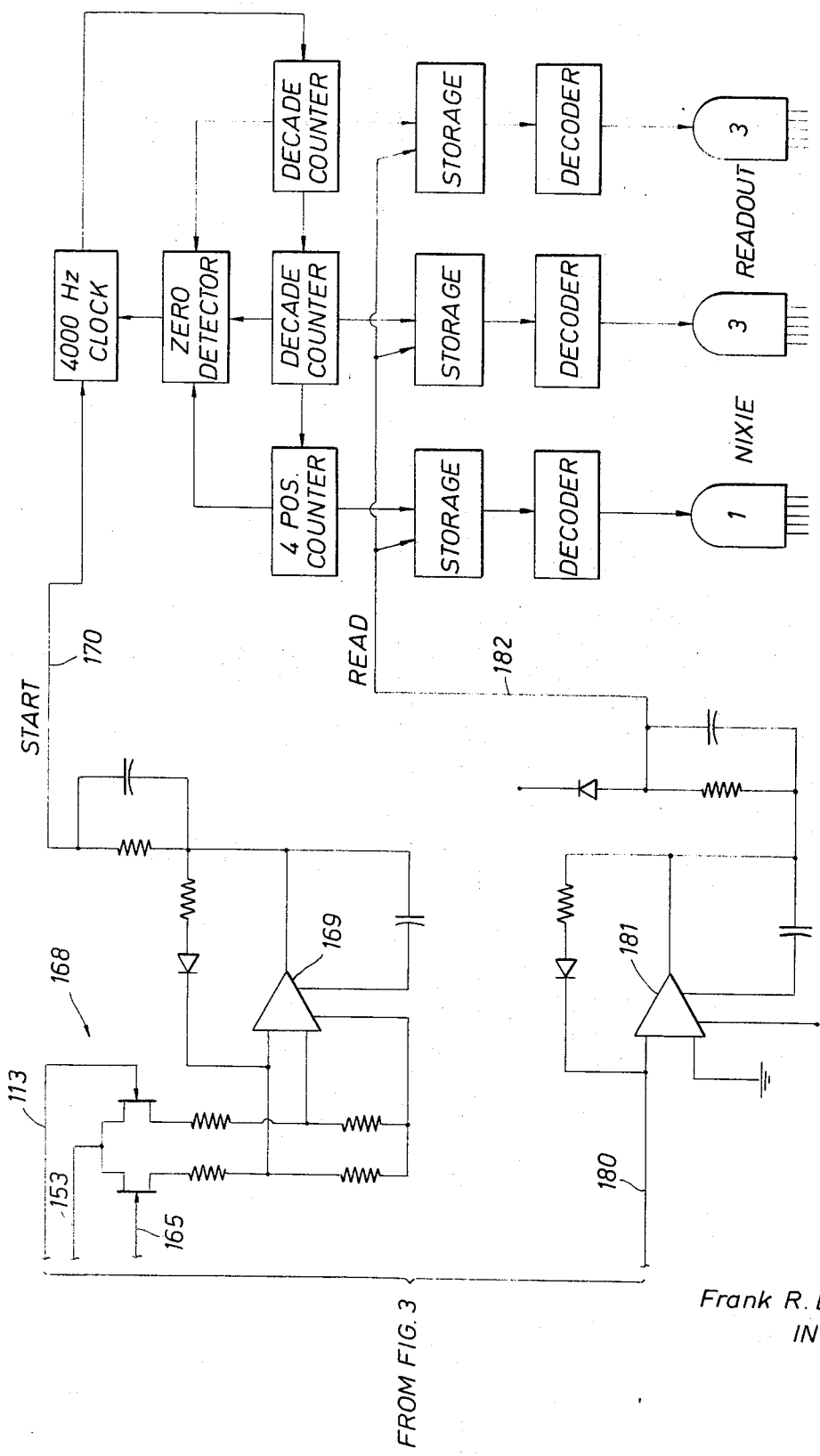

Many objects and advantages of the present invention will become more readily apparent from a consideration of the following written specification and drawings which are:

FIGS. 1A and 1B together show the schematic wiring diagram of the present invention with certain portions thereof shown in block diagram;

FIG. 2 is a voltage discharge curve which aids understanding of the mode of operation of the present invention;

FIG. 3 is a partial schematic showing in greater detail certain portions of circuitry shown in FIG. 1 including the circuit elements which cooperate to calibrate the straight line resonses of the various selected color filters; and, FIG. 4 is an additional schematic which connects with the circuitry shown in FIG. 3 disclosing additional details of the densitometer cooperative with the present invention.

In the drawings, attention is first directed to FIG. 1 which discloses a block diagram schematic of the photographic density measuring apparatus of the present invention which is indicated generally by the numeral 10. A sample 12 is indicated in the lower portions of FIG. 1A and is illuminated by a light source 13 which is operated by a regulated five volt supply 14. The light from the lamp is communicated through a fiber optics conductor 15a which preferably conducts the light to to a probe housing 16. The probe housing 16 is drawn separate and apart from the remainder of the apparatus to indicate that it is movable to examine a sample at any location. The apparatus not associated with the probe 16 can be located physically remote from the probe. Hence, the fiber optics path 15a is preferably of measurable length and will extend from the electronics portion of the equipment to the probe proper. The distance may be a few inches or 2 or 3 feet. This is sufficient flexibility to normally give the operator an opportunity to measure the sample 12 at some distance remote from the electrnic portion of the apparatus. Of course, the light bulb electronic its regulated supply may be located in the probe housing proper if desired.

An additional fiber optics path indicated at 15b conducts reflected light from the sample 12 to a photo multiplier tube 17. Again, the remoteness of the sample 12 from the photo multiplier tube 17 is overcome by the physical positioning of the fiber optics 15b between the sample and the tube 17.

From the foregoing, it will be understood and appreciated that the fiber optics 15a and 15b accommodate physical placement of the required apparatus with respect to the sample 12 and the length thereof is subject to variation over a wide range.

The conventional arrangement of the probe 16 is to provide a suitable structure which is positioned a certain distance from the sample 12 so that the light from the bulb 13 travels a controlled distance to the sample 12. Also, the reflective light input to the fiber optics 15b travels the same distance also. The housing of the probe 16 preferably carries a push button switch 18 which, when actuated, initiates operation of the apparatus shown in FIG. 1 to obtain a measurement of the optical density.

Returning to the circuitry associated with the tube 17, it will be noted that the fiber optics 15b directs the light toward the cathode of the tube 17. The tube 17 includes a series of dynodes which provide a multiplication effect. Light impinging on the cathode dislodges a few electrons which travel toward the first dynode indicated by the numeral 17a. The first dynode responds to the influx of electrons and ejects some electrons of its own to provide some aplification. By the time the signal arrives at the anode 17b, multiplication of perhaps one million fold has been obtained. This then provides an adequate signal level for use in the remainder of the circuitry. Of course, the function of the photo multiplier tube is believed well known in the art, and consequently, the theory of operation herein will be abbreviated.

Of particular interest to the arrangement shown in FIG. 1A is the use of an isolated, floating, cathode-to-dynode supply which is indicated by the numeral 19. The regular dynode power supply is indicated by the numeral 20. The supply 19 is connected between the cathode 17c and the first dynode 17a. It is well regulated preferably, and the terminal voltage of the floating supply 19 is preferably well regulated to obtain linear operation of the dynode 17a. The secondary emission or gain of the dynode in question is quite linear when utilizing the preferred arrangement described herein.

On the other hand, the main power supply 20 is connected by the conductors 21 and 22 through a switch 18. On operation of the switch, sufficient voltage is provided to charge a capacitor 25. The capacitor 25 is adjusted slightly by a parallel capacitor 23 and is also in parallel with a calibration resistor 24. It will be noted that the low voltage side of the capacitor 25 is connected directly to ground.

As shown in FIG. 1A, the tube 17 includes a series of additional dynodes which are indicated generally by the numeral 17d. The dynodes are connected serially to increasing voltage points of a resistive netwrok indicated generally by the numeral 26. Resistors comprising the resistive network are preferably equal so that the voltages on the various dynodes increase by equal measures. For instance, the drop across each of the resistors in the network 26 may be 100 volts to provide the proper spacing or separation to the various dynodes.

From the foregoing, the tube 17 is connected to circuitry which, being summarized, is an RC decay circuit. The RC circuit provides the required or necessary voltages for operation of the tube 17. This is true for all stages of the tube 17 except the first dynode 17a which is connected directly to the cathode 17c through the power supply 19 which continuously maintains an adequate cathode-to-dynode voltage for linear operation.

The numeral 28 indicates a current reference generator which is adjustable to provide a certain current flow through a resistor 29. The resistor 29 is connected to a level detector amplifier 30. When a predetermined level is indicated by the amplifier 30, it operates a one shot multivibrator 31 to form a signal on a conductor 32. The current flow from the tube 17 to the resistor 29 and the level detector amplifier 30 controls operation of the amplifier 30. For an understanding of this, attention is temporarily directed to FIG. 2 of the drawings. The graph of FIG. 2 shows the charging curve of the RC time circuit which principally includes the capacitor 25. That portion of the curve indicated by the numeral 33 indicates the charging operation of the capacitor. The numeral 34 indicates the optimum charging voltage on the capacitor 25 which is related to the terminal voltage of the power supply 20. Clearly, the charging of the capacitor 25 occurs so long as the switch 18 is held depressed. On release of the switch 18, the capacitor 25 begins to discharge and this point is indicated by the numeral 35 on the voltage curve of FIG. 2. The numeral 36 indicates the beginning of the exponential discharge curve describing operation of the RC time circuit which is connected across the tube 17.

The tube 17 is clearly rendered operative by the provision of a suitable voltages to the various tube elements. The provision of an over voltage is of no particular consequence to its operation. As the charge on the capacitor is drained through the resistive network 26, the tube continues to operate and provides an output current to the level detector amplifier 30. Dependent on the setting of the current reference 28 and the value of the resistor 29, the input voltage to the detector amplifier 30 will reach the predetermined level which is indicated by the numeral 37 in FIG. 2. Detection of the predetermined level at the amplifier 30 then operates to the multivibrator 31 to form a pulse on the conductor 32, and the use of this pulse will be described in detail when discussing FIG. 1B.

Returning again to FIG. 1A, a conductor 39 communicates with a differential amplifier 40 which is connected to an additional single shot multivibrator 41. The vibrator provides a pulse on a conductor 42 to be described. The differential amplifier is provided with an input voltage from a reference source indicated by the numeral 43. The amplifier compares the voltages on the conductor 39 and from the reference source 43. The connection of the conductor 39 to the RC circuit described hereinbefore should be noted. As will be recalled, the RC circuit is charged and decays exponentially as shown in FIG. 2. The conductor 39 is connected to the high side of the RC circuit, and consequently, the voltage on the conductor 39 decays in the manner shown in FIG. 2. The differential amplifier 40 operates when the voltage on the conductor 39 reaches the point 38 shown in FIG. 2.

The settings of the level detectors 30 and 40 should now be considered. The circuitry connected to the level detector 40 is adjusted to produce a pulse, a read pulse hereinafter, when the dynode supply voltage equals that required to obtain an anode current from a sample 12 having an optical density of zero. That is to say, if the sample 12 shown in FIG. 1A had an optical density of zero, and if the tube 17 were powered continuously with the anode current matching that of the reference source 28, a particular dynode voltage would be determined. This is the voltage indicated at the level 38 on the decay curve shown in FIG. 2. This is the dynode voltage resulting from zero optical density and hence, is the level at which the read pulse is generated.

When a sample having a density other than zero is measured, a higher dynode voltage is required to obtain an anode current matching that of the reference source 28. This voltage is indicated at 37 in FIG. 2. When the dynode voltage decays to this value, a start pulse on the conductor 32 is generated by operation of the level detector 30 and the pulse generator 31.

Attention is next directed to FIG. 1B of the drawings. The start pulse is supplied on the conductor 32 which communicates with a gate 48. The gate 48 is supplied with pulses from an oscillator 50 at a controlled rate. In the preferred embodiment, the rate is four thousand hertz, although clearly any other rate may be selected. At any event, the pulses from the clock 50 are input to the gate 48.

The clock pulses from the oscillator 50 are fed through the gate 48 and to a decade counter 51. The decade counter is connected to another decade counter 52 which is then input to an additional decade counter 54. The output of this counter is then provided to another counter indicated by the numeral 55. While the first three counters are decade counters, the last counter need only be a four position counter. Inasmuch as a density reading of 4.00 corresponds to a change in light intensity of ten thousand to one, it is apparently unnecessary to permit the counter 55 to count a full decade.

Each of the four counters enumerated above is connected to a zero detector 56. The zero detector 56 is then input to a gate 48 to stop its operation. Thus, once the gate 48 passes clock pulses from the oscillator 50 to the first counter 51, the apparatus counts unabated until the zero detector recognizes a zero count in each of the four counters. At this juncture, the gate 48 is stopped and the original quiescent condition is achieved.

The numerals 57, 58 and 59 indicate three storage means connected to the indicated counters. Each storage device is output to a BCD to decimal conversion means indicated by the numerals 60, 61 and 62. Each decimal conversion means is connected to an output means, such as a Nixie tube, indicated by the numerals 63, 64 and 65. The read pulse input on the conductor 42 to the circuitry shown in FIG. 1B is connected to the storage means 57, 58 and 59. When the pulse enables the various storage means, the numbers in the counters 52, 54 and 55 are transferred through the decimal conversion means to the output means shown in FIG. 1B. A visible indication to the operator is provided at the output means and the form is the preferred decimal presentation in which optical density is always indicated. Through the operation of the circuitry shown in FIG. 1B, the start pulse and the read pulse are utilized to obtain a visible indication of the desired measurement.

The apparatus of the present invention is calibrated by adjusting the resistor 24. The exponential curve 36 shown in FIG. 2 is stretched out or compacted by adjustment of the resistor in the calibration means 24. More will be noted concerning such adjustments when FIGS. 3 and 4 are explained.

It will be recalled that the definition of optical density is a logarithmic function as stated hereinbefore. The decay of the capacitor charge, and more particularly the curve shown in FIG. 2, traces an exponential wave form. The utilization of the clock running at a controlled linear rate in conjunction with the exponential curvature converts the optical density data to the desired digital indication. Moreover, the absolute values of the light being measured may vary over a range of perhaps ten thousand to one which is a very wide swinging range, but the apparatus of the present invention measures such wide swinging variations while varying the voltage on the photo multiplier tube 17 by less than four to one. Moreover, the apparatus is particularly linear in operation. As noted above, the portion of the tube 17 which amplifies the weakest signals is connected to a floating voltage supply to be sure that the stage has adequate voltage for linear operation.

Another way of calibrating the equipment is to adjust the oscillator 50. With a given sample 12 of known optical density, a reading is taken and the digital indication at the output means 63, 64 and 65 is noted. Should the indication be too high, the clock source is slowed down and another reading is taken. Should the indication be too low, the clock is speeded up and the digital output is observed. Clearly, the calibration is relatively easily obtained and will maintain itself over an indefinite period of time.

The present invention has particularly good repeatability characteristics. Moreover, the apparatus is essentially without complicated compensating circuits or the like to shape the curvature shown in FIG. 2 to conform with the optical density definition set forth hereinabove. As a consequence, the apparatus is particularly reliable over a long period of time and is further essentially immune to warm-up problems ever present in competitive devices. For instance, most competitive devices are preferably left on around the clock to maintain the equipment at a stabilized temperature. The present invention is essentially immune to variations in component value with temperature.

Considering next the detailed circuitry shown in FIGS. 3 and 4, the numeral 105 indicates a power plug providing power for the equipment. It is connected with a first power supply 110 which forms several voltage levels. For instance, the conductor 111 is preferably about 15 volts. The conductor 112 is about 100 volts. The conductor 113 is preferably about twelve volts. The conductor 114 is preferably about twelve or thirteen volts. The conductor 115 is a ground common to several components of the circuitry.

An additional power supply is included at 116. The power supply 116 forms much higher DC levels. As illustrated, the power supply 116 is likewise connected with the ground 115. The conductor 117 provides a voltage approximately 600 volts below ground which is utilized in operating all but one of the dynodes of the photo multiplier tube in the manner described with respect to FIG. 1A previously. The conductor 118 provides a voltage level which is approximately 100 volts lower than that on the conductor 17 which is connected to the first dynode of the photo multiplier to serve as the stabilized voltage supply connected between the cathode and the first dynode. It corresponds to the floating first dynode supply previously discussed with respect to FIG. 1A. The voltage level between the conductors 117 and 118 remains fixed.

The conductors 119 and 120 are preferably connected with the regulated light source 121 as shown in FIG. 3. The regulated light source operates the lamp 122 to maintain a specified light output. The lamp 122 forms a specific level of light which is directed to the sample 123 and which sample forms either reflected or transmitted light of an intensity proportional to the density of the sample. In any case, this reflected or transmitted light passes through a lens 124. The lens is selected dependent on the color required. An additional lens 125 is made available so that the lenses can be swapped or interchanged. The lenses correspond typically to the three primary colors and to white. Without regard to the specific lens used, light is reflected from the sample 123 to a lens 124 and into a fiber optics path 126. The fiber optics path directs the light to the cathode of a photo multiplier tube 127.

The photo multiplier tube includes a cathode on which the light impinges. A first dynode 128 provides a first stage of amplification. Additional dynodes are included such as those represented generally at 129. At each stage, the signal is amplified. The final amplified signal arrives at the anode or plate 130 which forms a signal on the output conductor passing through a load resistor 131 and to additional portions of the circuitry to be described.

As described above, voltage is supplied to the photo multiplier and thereafter permitted to decay as graphically shown in FIG. 2. A capacitor 134 is connected across a resistive circuit which includes the several resistors indicated at 135. The numeral 136 indicates the start switch which initiates the taking of data. The switch 136 is connected in parallel with a capacitor 137. The switch 136 is normally closed and hence shorts the capacitor 137. When the switch is operated, the capacitor begins to charge through a resistor 138. The charging rises to a level sufficient to cause the unijunction transistor 140 to fire. The unijunction transistor 140 fires, forming a large pulse which passes through the load resistor to ground indicated at 141. The pulse formed across the resistor 141 is supplied to a pair of transistors 142 and 143 for amplification. The transistor 143 is either on or off. When it is off, no current flows through its collector load which is the relay coil 144. When current does flow, a relay coil 144 is energized and it closes a switch 145 found in the conductor 117 to provide electrical power from the voltage supply 116 to the capacitor 134. Thus, actuation of the switch 136 charges the capacitor 134 in the manner described previously. The voltage between the conductors 117 and 118 therefore provides adequate power to the first dynode 128 of the photo multiplier and additionally, more than adequate voltage for the other dynodes and the plate.

The relay 144 is protected from voltage fly-back by the diode 146.

Attention is next directed to the conductor 112 which provides approximately one hundred volts from the power supply 110. A series voltage regulator, including a transistor 150, forms an output level of approximately forty volts. Additionally, the conductor 113 forms a level of something in the range of twelve volts. The conductor 113 communicates through a diode 151 to a bus 152. The series voltage regulator transistor is also connected with a bus 153. Four adjustable resistors indicated by the numerals 154, 155, 156 and 157 are connected between a pair of busses which differ by approximately 25 to 30 volts. The adjustable taps are moved or located in a manner to be described.

The numeral 160 indicates a rotary switch which selects one of the taps and its adjustable resistor. The switch 160 is operated to the four positions dependent on the color filter 124 utilized. The system is provided with preferably four filters which correspond to the three primary colors and white. The switch 160 is likewise appropriately marked, and has four positions corresponding to the four filters. The taps of the various adjustable resistors are located to specify the maximum voltage applied to the photo multiplier tube 127 and hence, determine the maximum plate current through the resistor 131. The circuitry of the photo multiplier tube 127 includes a positive voltage being determined by the resistors 154 – 157, inclusive, as selected by the switch 160, and also includes series resistors 161 and 131 connected to the anode or plate 130 of the tube. The various dynodes are negative with respect to the plate and the cathode is the most negative element of the tube. The use of the four adjustable resistors which are selected by the switch 160 determines the reference current flowing in the plate circuitry for the four colors. Preferably, all of the colors are adjusted so that the current flow is the same. This accommodates the differences in the transmission abilities of the various optical systems, and particularly the difference between the white and three primary colors.

It should be noted that the midpoint between the resistors 131 and 161 is connected to a conductor 165 which extends to FIG. 4 of the drawings. The conductor 165 is the input to one side of a temperature stabilized differential amplifier including a pair of field effect transistors indicated generally at 168. The output of the pair is next input into a differential amplifier 169. The differential amplifier 169 senses the passage of the voltage level on the conductor 165 through a particular level. It will be noted that two additional conductors are input to the field effect transistors. The conductor 153 is connected with a measurably high voltage. The second of the two conductors is indicated by the numeral 113 and is connected to the second of the two field effect transistors as shown in FIG. 4. Hence, the only signal which varies is the voltage level on the conductor 165 which swings as the charge on the capacitor 134 decays, which thereby varies the current in the plate circuit of the photo multiplier tube 127. This variation is supplied by the conductor 165 to the circuitry just mentioned. The differential amplifier 169 is a high gain device which saturates and provides an output level which is quite negative or positive. A typical swing might be from −10 volts to approximately +10 volts, presuming that the reference is ground. In any case, this forms a pulse carried on a conductor 170 which will be labelled the start pulse hereinafter. The start pulse is handled in the manner discussed previously with respect to FIG. 1B to initiate the clock operation and to store the data.

It will be recalled that the RC circuit is permitted to discharge until its voltage level matches that causing the photo multiplier tube to conduct at a specified level. This is obtained in the following manner. The numeral 175 identifies a resistor connected to the voltage bus 113. The resistor 175 is connected to conductor 180 and resistors 178 and 179. This network is used to detect the time at which the RC circuit voltage has decayed to the predetermined reference value. As the RC circuit voltage decreases, the voltage on conductor 180 will switch from a negative to a positive level at the previously described reference value. The conductor 180 extends to FIG. 4. The diodes 176 and 177 limit the maximum voltage swing on conductor 180 which is input to a differential amplifier 181 which is similar in function to the differential amplifier 169. The second input is connected with a level to be compared, and an economy of manufacturing is achieved through the use of ground which is compatible with the voltages mentioned.

A read pulse is formed through the use of the signal on the conductor 180. Viewing the string of resistors, including the resistors 175, 178 and 179, it will be recalled that the upper end is connected to some positive value such as approximately twelve volts or so. The lower end is connected to some negative value which decays as the charge on the capacitor 134 decays. As this decay progresses, the voltage level on the conductor 180 passes through the reference point, the swing being limited to about one volt spanning the reference level. In the preferred embodiment, the reference level is ground. An input signal is provided to the differential amplifier 181 which forms an output pulse. This amplifier, being like the other, will swing from roughly −10 to +10 volts with a fairly sharp rise to thereby create a read pulse. The read pulse is conducted on the line 182 to the circuitry which was described above for accumulation of the clock pulses which form the output digital signal. It will be recalled that the output digital signal results from the storage of clock pulses by virtue of the logarithmic relationship best shown in FIG. 2.

The voltage level communicated by the conductor 180 is dependent on the voltage on the conductor 117. The rate of discharge is dependent on the equivalent resistor circuitry connected across the capacitor 134. The string of resistors 135 is fixed. The resistors 178 and 179 are likewise fixed. However, calibration values are adjusted for white and the four colors in the following manner. A switch 188, preferably ganged with a switch 160, is connected by a resistor 189 to the conductor 117. The switch selects one of four terminals. Each terminal is connected with a suitable adjustable resistor indicated by the numerals 190 – 193, inclusive. Each of the adjustable resistors is connected across the capacitor 134 through the switch and the resistor 189. Such a connection therefore adjusts the relative or equivalent resistance connected across the capacitor. This permits fine tuning of the decay interval for discharge of the capacitor.

The fine tuning is achieved for each of the separate four colors which are handled by the densitometer. Thus, the resistor 190 may be associated with the use of the white filter. This can correspond to the resistor 154. Therefore, the switches 160 and 188 are preferably ganged together. The same is done for the three remaining adjustable resistors. Each pair of adjustment compensates for the different quantity of light entering the photo multiplier tube with different filters and the variation in tube characteristics with different color spectrum.

It is believed that a description of the data handling circuitry shown in FIG. 4 is not necessary inasmuch as the circuitry has been described with respect to FIG. 1B. The schematic representation is substantially the same, except it has been simplified somewhat in FIG. 4.

In comparing the more detailed disclosure of FIG. 3 with that of FIG. 1A, it will be observed that the detailed circuitry yields correspondence with the blocks which are represented rather generically in FIG. 1A.

The foregoing is directed to the preferred embodiment of the present invention. The terminology adapted herein is adapted to the claims which are appended hereto.

What is claimed is:

1. Optical density measuring apparatus for measuring and indicating the optical density of a sample, comprising:
    a. a photo multiplier tube having a cathode, a plurality of dynodes, and an anode;
    b. regulated light source means for directing a regulated level of light toward a sample;
    c. means for directing light from the sample, the quantity thereof being determined by the optical density of the sample, and directing light therefrom toward the cathode of said photomultiplier tube;
    d. a power supply;
    e. an RC circuit connected with said power supply and connected across the dynodes of said photo multiplier tube to provide operating voltages thereto;
    f. said RC circuit including intermediate taps for the dynodes of said photo multiplier tube, the voltage level provided by said taps being such that cathode of said photo multiplier tube is provided with the lowest voltage and the anode is provided with the highest voltage;
    g. voltage level detector means responsive to the voltage level at the anode of said photo multiplier tube and being further adjustable to determine a voltage level of predetermined magnitude at the anode thereof in response to a calibration of said optical density measuring apparatus to a standard or reference optical density and forming a signal on detection of a voltage level at the anode equal to the predetermined magnitude;
    h. second voltage detector means connected with said photo multiplier tube and responsive to a voltage level provided therefrom for detecting a subsequently occurring voltage level of said multiplier tube which is at least partially determined by the optical density of the sample and forming a signal on detection of a voltage level resulting from the optical density of the sample;
    i. pulse source means;
    j. digital register means; and,
    k. circuit means operated by said first and second voltage detection means for controllably connecting said pulse source to said register means for accummulating a count in said register means indicative of the optical density of the sample in digital representation.

2. The invention of claim 1 wherein said RC circuit is connected across at least two dynodes of said photo multiplier tube and further including a voltage supply adapted to be connected to the anode of said photo multiplier tube to cause the current flow therethrough.

3. The invention of claim 2 further including an adjustable series resistor interposed between said additional voltage supply and said anode for controllably adjusting the current at said anode.

4. The invention of claim 2 further including multiple adjustable resistors controllably connected to said anode, each of which is adjustable to a separate voltage level.

5. The invention of claim 2 wherein four variable resistors are collectively connected to said additional voltage supply, and a switch means is selectively connected from said anode to one of said variable resistors to provide a DC level determining the point of operation of the anode current of said photo multiplier tube.

6. The invention of claim 5 further including color filters which are adapted to be selectively inserted at some point in the light path traversed by light from said light source to said photo multiplier tube in a manner to make said photo multiplier tube selectively responsive to colors passed thereby.

7. The invention of claim 2 further including a resistive circuit connected across at least a pair of dynodes of said photo multiplier tube for altering the rate of decay of voltage provided to said RC circuit connected with said photo multiplier tube, said resistive circuit being adjustable to provide an adjustable rate of decay to the voltage level at said RC circuit.

8. The invention of claim 7 wherein selected filters are adapted to be interposed in the light path of the light transferred from the sample to said photo multiplier tube for color selectivity and including an adjustable resistor for each of said light filters in said resistive network, and switch means selecting a resistor to match a light filter.

9. For use in a densitometer circuit including a light responsive means which forms an output signal indicative of the level of light falling on the light responsive means for a specimen wherein the light level is measured at least partially through the use of said light responsive means and said light responsive means causes the formation of a first current flowing in a portion of the densitometer with a value corresponding to a first predetermined light level and causes the formation of a second current flowing in a portion of said densitometer with a value corresponding to a second predetermined light level and said first and second currents are obtained from a common signal waveform, the improvement which comprises a first circuit means for controllably adjusting the first current and a second circuit means for controllably adjusting the second current flow, said first and second means operating independently of one another over at least a specified range of adjustment.

10. The invention of claim 9 including first and second filters which are adapted to be interposed at some point in the path of the light falling on the light responsive means to vary the spectrum of light falling on said light responsive means, and said first means comprises selectively operable means for adjusting the first current dependent upon which filter is selected to be interposed in the light path.

11. The invention of claim 9 wherein said light responsive means incorporates a photo multiplier tube having an anode, a cathode, and several dynodes, and further including:
a voltage supply;
an anode load impedance connected between the anode of said photo multiplier tube and said voltage supply to create a current flow through said anode load impedance; and,
said first means being connected to controllably adjust the current flow in said anode load impedance.

12. The invention of claim 11 wherein said first means includes at least a pair of adjustable resistors which are connected with a voltage source and said resistors are adapted to be controllably adjusted to form differing voltage levels.

13. The invention of claim 12 wherein said adjustable resistors are selected by a switch means.

14. Optical density measuring apparatus which measures the optical density of a sample, comprising:
a photo multiplier tube having an anode and cathode wherein said cathode is responsive to light falling thereon for altering the current flow in said photo multiplier tube;
a power supply means operatively connected to the dynodes of said photo multiplier tube;
means for controllably altering the voltage level provided to said photo multiplier tube from said power supply means;
means for directing light from a sample to the cathode of said photo multiplier tube for altering the current flow therein in response to the light from such a sample;
means operatively connected to the anode circuit of said photo multiplier tube for monitoring current flow thereof, said monitoring means responding to a current flow related to a sample of known optical density, and further responding to the current flow from said photo multiplier tube determined by such a sample of unknown density; and,
output means connected to said monitoring means and forming an indication of optical density of such a sample in response to operation of said monitoring means.

15. The invention of claim 14 wherein said power supply means and said means for altering the voltage level thereof together include:
a power supply forming a DC level;
an RC circuit connected across said photomultiplier tube wherein said anode is operated at a higher voltage than the other elements thereof;
said RC circuit further including taps for a dynode incorporated in said photo multiplier tube to provide a voltage thereto intermediate between the voltage provided to the cathode and anode thereof;
switch means for controllably connecting said power supply to said RC circuit to controllably increase the voltage thereacross; and,
said monitoring means being connected with said RC circuit to provide signals thereto for operation of said monitoring means.

16. The invention of claim 15 further including a plurality of series resistors in said RC circuit, said tap for the dynode of said photo multiplier tube being connected at a point of interconnection between said series resistors.

17. The invention of claim 16 wherein said RC circuit means includes an adjustable capacitor.

18. The invention of claim 14 wherein said monitoring means incorporates a level detector means connected with the anode of siad photo multiplier tube and responsive to the voltage level thereof, and is further operative to indicate coincidence with a voltage level representative of the known sample.

19. The invention of claim 14 further including:
a. a numerical digital output means;
b. a pulse source connected to said digital output means for providing a procession of pulses thereto; and,
c. said output means admitting a number of pulses from said source of pulses as a means of indicating a variable count representative of the optical density of the sample, said means being operated in a manner to relate the number of pulses from said pulse source stored in said numerical digital output means to the density of the unknown sample.

20. The invention of claim 14 wherein said photo multiplier tube incorporates a plurality of dynodes, one of which is designated the first dynode, and which receives electron emission from the cathode thereof, and further including:
  a. isolated power supply means for providing an operating voltage above a predetermined level, said power supply means being connected between the cathode and the first dynode of said photo multiplier tube; and,
  b. wherein said power supply means is operatively connected to the first dynode to the anode of said photo multiplier tube.

21. The invention of claim 14 further including a light source providing a controlled quantity of light for the sample, and further including means for directing light from the sample to said photo multiplier tube for impinging on the cathode thereof.

22. The invention of claim 14 further including:
  a. a regulated light source;
  b. means for directing a regulated quantity of light from said light source to the sample;
  c. means for directing light from the sample originally directed thereto by said regulated light source, the amount thereof being determined by the optical density of the sample, said means redirecting the light from the sample to said photo multiplier tube; and,
  d. said photo multiplier tube being varied in its operation by the light impinging on the cathode from the sample.

23. The invention of claim 22 including fiber optics serving as a transmission means for light from such sample to said photo multiplier tube, said fiber optics providing a constant transmission loss such that variations in light level impinging on said photo multiplier tube include those variations caused by the sample itself.

24. The invention of claim 23 wherein said fiber optics means extends from the vicinity of said photo multiplier tube to a point remote therefrom and the remote end thereof is movable at least over a limited range of movement.

* * * * *